UNITED STATES PATENT OFFICE.

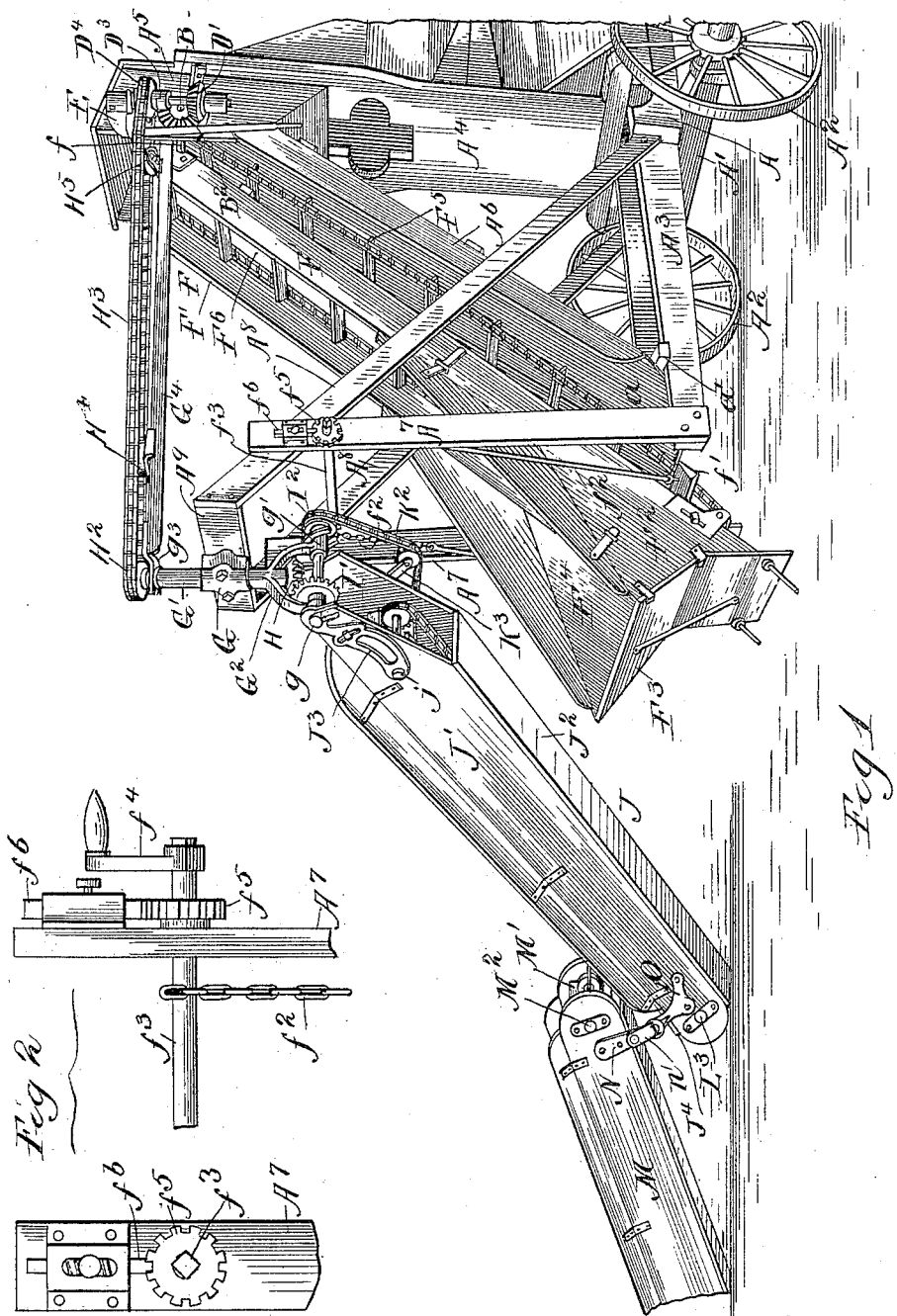

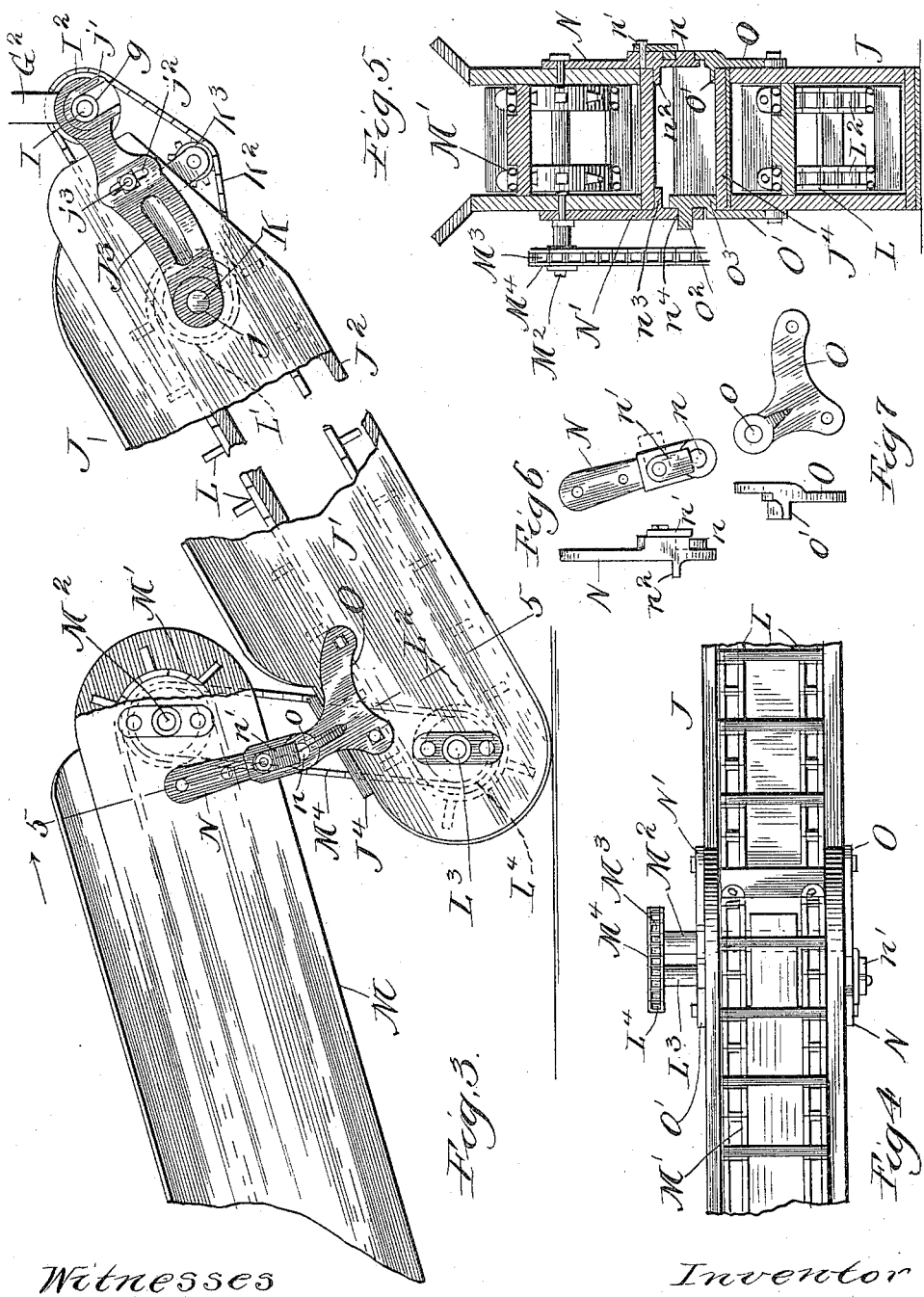

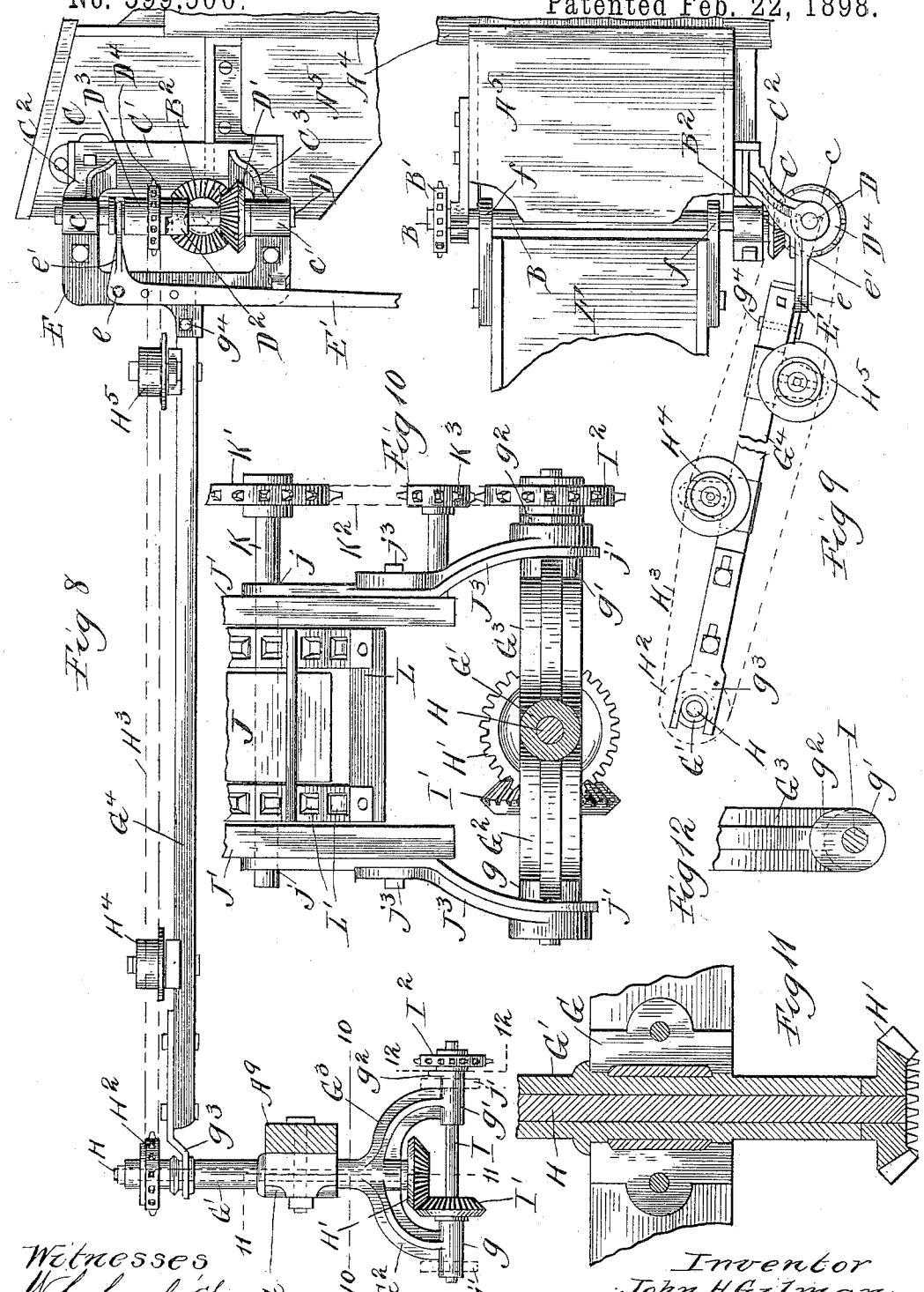

JOHN H. GILMAN, OF OTTAWA, ILLINOIS, ASSIGNOR TO THE KING & HAMILTON COMPANY, OF SAME PLACE.

CONVEYER FOR CORN-SHELLERS.

SPECIFICATION forming part of Letters Patent No. 599,500, dated February 22, 1898.

Application filed April 24, 1897. Serial No. 633,607. (No model.)

*To all whom it may concern:*

Be it known that I, JOHN H. GILMAN, a citizen of the United States, residing at Ottawa, in the county of La Salle and State of Illinois, have invented a certain new and useful Improvement in Conveyers for Corn-Shellers, which is fully set forth in the following specification, reference being had to the accompanying drawings, in which—

Figure 1 is a perspective of the rear end of a corn-sheller, showing the feed-conveyer, &c., constructed according to my invention. Fig. 2 comprises two detail views, in side and end elevation, of the adjusting mechanism of the conveyer. Fig. 3 is a side elevation, with parts broken away, of the extension-feed and supplemental feed. Fig. 4 is a plan view, upon a diminished scale, of the greater part of the structure shown in Fig. 3. Fig. 5 is an approximately vertical cross-section on the line 5 5 of Fig. 3. Fig. 6 comprises two detail views of one of the castings connecting the extension-feed and supplemental feed. Fig. 7 comprises two similar detail views of another complementary casting. Fig. 8 is a side elevation of the mechanism adapted to transmit power to the extension-feed. Fig. 9 is a plan view of the structure shown in Fig. 8 with parts broken away. Fig. 10 is a horizontal section on the line 10 10 of Fig. 8, showing also the end of the extension-feed. Fig. 11 is a vertical section on the line 11 11 of Fig. 8. Fig. 12 is a vertical section on the line 12 12 of Fig. 8.

My invention relates to corn-shellers, and particularly to that mechanism adapted to convey the ears of corn to the sheller.

My invention has for its object to adapt such mechanism readily to changes in the direction from which it is desired to feed the machine, to regulate the rapidity of the feed, to enable the parts of the feeding mechanism to be easily disengaged for the purpose of moving the machine, and generally to increase the efficiency of operation, the ease of running, and the cheapness of construction of this portion of a corn-sheller.

My invention consists in various improved features of construction, one specific form of which has been shown in the drawings, and may now be described.

Referring to the drawings by letter, A designates the main longitudinal sills of the machine, supported from the axles $A'$, which are carried by the wheels $A^2$ in the usual manner. The sills A are extended rearwardly, as at $A^3$, for a purpose that will shortly be referred to. The rear main upright $A^4$ of the machine carries at its upper end a hood $A^5$, which forms the entrance of the hopper leading to the shelling-cylinder. From the said hood there extend diagonally downward and rearward two side pieces $A^6$, inclosing between them a bottom $a$, the lower end of which rests against the cross-piece $a'$, this structure forming the return-trough of the conveyer. From the ends of the sill extensions $A^3$ rise the uprights $A^7$. Two diagonal braces $A^8$ extend from the ends of the sills proper, A, rearward and upward beyond the ends of the uprights $A^7$, to which they are secured, and the ends of the braces $A^8$ are united by a cross-piece $A^9$. The foregoing parts constitute the rigid framework of that portion of the machine connected with my invention.

In bearings formed upon opposite sides of the hood $A^5$ is mounted a transverse shaft B, carrying upon the end opposite that shown in Fig. 1 a sprocket-wheel $B'$, which is driven by a sprocket-chain (not shown) from the power-shaft of the machine, and upon its other end a bevel-gear $B^2$.

Upon that side of the hood $A^5$ shown in Fig. 1 is mounted a casting C, comprising a plate $C'$, secured to the side of the hood, an upper and a lower bracket $C^2$ and $C^3$, respectively, provided with vertical bearings $c$ and $c'$, respectively. In these bearings is mounted a short vertical shaft D, carrying near its lower end the bevel-gear $D'$, which meshes with the bevel-gear $B^2$, whereby the shaft D is revolved. Above the bevel-gear $D'$ is keyed a clutch member $D^2$. A second clutch member $D^3$, carrying a sprocket-wheel $D^4$, is loosely mounted upon the shaft D in the form of a sleeve above the clutch member $D^2$, and is adapted to engage therewith and be driven thereby when so in engagement.

To the bearings $c$ and $c'$ are secured the upper and lower ends of the yoke-casting E, upon which is pivotally mounted, as at $e$, a lever $E'$. The said lever is provided with a fork $e'$, which engages with the clutch member D³. As the end of the lever is thrown backward or forward the clutch member D³ is lowered or raised and the sprocket-wheel D⁴ is revolved or thrown out of operation.

That portion of the feeding mechanism which conveys the ears of corn directly to the hopper of the machine, and which I shall term the "conveyer" F, comprises the sides F', which are raised and flared outwardly at their lower ends, as at F², and provided with an end piece F³ to form a hopper F⁴. At their upper ends the sides F' are provided with bearings $f$, which engage the shaft B, whereby the conveyer is pivoted at its upper end on the said shaft. The conveyer further comprises the usual chain-and-shovel mechanism F⁵, which travels upward along the bottom F⁶ of the conveyer and which is driven from the shaft B in the usual manner and so not illustrated. To a cross-piece $f'$, secured to the lower end of the conveyer, are attached the lower ends of the rods and chains $f^2$, the upper ends of which are adapted to be wound upon the windlass $f^3$, horizontally mounted in the uprights A⁷. The said windlass is provided at one end with a crank $f^4$ and ratchet $f^5$, while a spring-actuated pawl $f^6$, mounted upon the upright A⁷, holds the windlass in any given position. By this mechanism the lower end of the conveyer is raised or lowered. According as it is raised, the feed is increased, each shovel carrying a large number of ears of corn. According as the lower end of the conveyer is depressed, the feed is correspondingly diminished. By these means the rate of feed may be easily and accurately gaged.

To the cross-piece A⁹ is secured a bearing-box G, in which is rotatably mounted a sleeve G', which at its lower end forks into two branches G² and G³, provided with the horizontal bearings $g$ and $g'$, respectively. On the outside of the bearing $g'$, a short distance from the branch G³, is formed a lug $g^2$ for a purpose later described. A strut $g^4$ engages, as at $g^3$, the upper end of the sleeve G', so as to permit the same to rotate therein, and at its other end is rigidly bolted to the yoke E, as at $g^4$.

In the sleeve G' is revolubly mounted the shaft H, carrying at its lower end a bevel-gear H' and at its upper end a sprocket-wheel H². A sprocket-chain H³ passes about the said sprocket-wheel H² as well as the sprocket-wheel D⁴, whereby movement is imparted to the shaft H according as the lever E' is shifted. Upon the strut G⁴, near opposite ends and on opposite sides thereof, are mounted the two chain-tighteners H⁴ and H⁵, each of which may be adjusted to tighten the sprocket-chain H³.

In the bearings $g$ and $g'$ is mounted a horizontal counter-shaft I, provided with a bevel-gear I', adapted to engage with and to be driven by the bevel-gear H' and with a sprocket-wheel I².

That portion of the feed mechanism which may be termed the "extension-feed" J comprises the sides J' and a bottom J², with conveying apparatus of the ordinary form mounted therein. Near their upper ends each of the sides is provided with a hooked arm J³, pivoted, as at $j$, to the said side, preferably being mounted upon the sprocket-shaft K, later described. Each of the said arms J³ at its free end is provided with a fork $j'$. One of the said forks is adapted to hook over the outside of the bearing $g$, the other to hook over the outside of the bearing $g'$ between the branch G³ and the lug $g^2$, whereby both arms are held firmly in position upon the said bearings. Each arm J³ is preferably provided with a slot $j^2$ transversely thereof and by a bolt $j^3$ in connection therewith. The arm J³ may be rotatably adjusted to a slight extent. The upper end of the extension-feed J is thereby firmly and adjustably secured through the intermediate parts to the rotatable sleeve G'. The sides J' of the extension-feed carry at their lower end, upon their upper edges, a cross-piece J⁴, for a purpose subsequently described.

In the sides J' of the extension-feed, at the upper end thereof, is mounted a shaft K, which, as before stated, forms the pivot-points for the arms J³. The said shaft carries upon one end a sprocket-wheel K', adapted to be driven by the sprocket-chain K², which connects it with the sprocket-wheel I². Upon that side of the extension-feed adjacent to these sprocket-wheels is mounted a chain-tightener K³.

The conveying mechanism L of the extension-feed, of the usual chain-and-bucket form, is driven from the sprocket-wheels L', mounted upon the shaft K, and in turn drives the sprocket-wheels L², mounted upon a shaft L³, journaled in the lower end of the extension-feed. Upon one end of the shaft L³, outside of the body of this conveyer, is mounted a sprocket-wheel L⁴.

In case it is desired to feed corn to the sheller from a still greater distance than would be permitted by the employment of the extension-feed alone there will be used the supplemental feed M, likewise in the nature of a conveyer, comprising the chain-and-bucket mechanism M', driven from the shaft M², mounted in the upper end of this supplemental feed. The shaft M² carries an outer sprocket-wheel M³, driven by the chain M⁴ from the sprocket-wheel L⁴. In order to supply devices adapted for readily connecting and disconnecting the supplemental feed with the extension-feed and for holding the former firmly in place upon the latter when connected, I mount upon each side of the supplemental feed a casting and upon each side of the extension-feed a second casting adapted to engage with the corresponding casting upon the supplemental feed. The casting N, (particularly illustrated in Fig. 6,) mounted upon one side of the supplemental feed, projects below the bottom of the same and is provided with a pin $n$, with a pivoted latch $n'$, and with a flange $n^2$, adapted to bear against the bottom of the said supplemental feed. Upon the opposite side of the said supplemental feed is mounted a somewhat similar casting N', provided with a flange $n^3$, corresponding with the flange $n^2$, and with a perforation $n^4$ in the place of a pin, such as $n$. Upon one side of the extension-feed is mounted a casting O, provided with a perforation $o$, adapted to receive the pin $n$, and with a flange $o'$, adapted to bear against the cross-piece $J^4$. Upon the opposite side of the said extension-feed is mounted a second casting O', provided with a pin $o^2$, adapted to engage in the perforation $n^4$, and offset, as at $o^3$, so as to bear against the cross-piece $J^4$. As will be seen, the pins $o^2$ and $n$ may be readily inserted in the corresponding perforations $n^4$ and $o$, respectively, of the offset castings and the latch $n'$ dropped down, thereby holding the castings firmly engaged and the supplemental feed securely connected with the extension-feed. The method of disconnecting the two is likewise apparent.

The advantages of feed mechanism for a corn-conveyer constructed as illustrated and hereinabove described, according to my invention, will be in great part apparent from the description of the said construction. Certain of the said advantages may be, however, specifically pointed out. In case it is desired to use only the conveyer F the extension-feed J may be readily disengaged from its connection with the machine. The lever E' may be moved to throw the clutch $D^3$ $D^2$ out of engagement, and that mechanism adapted to actuate the extension-feed J will remain motionless, while the machine as a whole continues in operation and is fed from the conveyer F. The extension-feed J will be in the same manner easily disconnected when the machine is to be moved from place to place. The mechanism adapted to transmit power to the said extension-feed is economical and convenient both in construction and in operation.

When it is desired to connect the extension-feed with the machine, the forks $j'$ are easily engaged with the bearings $g$ and $g'$, and the adjustment of the arms $J^3$ upon the sides of the extension-feed permits of this connection being adjusted within a certain range. When the said extension-feed is so connected with the machine, the lever E' may be moved and the clutch $D^2$ $D^3$ thrown into engagement, so that the conveying mechanism of the extension-feed is set in operation. The extension-feed, as is obvious, may be moved about through nearly three-quarters of a circle of rotation, according to the direction in which it is desired to receive the corn. Further, when it is desired to extend the feed mechanism to a greater distance the supplemental feed M may be employed. Its connection with the extension-feed is easily made and is secure when so made. This connection permits of the adjustment of the further end of the supplemental feed in a vertical plane, allowing the said end to rest upon the ground or to be raised.

Having thus described my invention, what I claim, and desire to secure by Letters Patent, is—

1. The combination of the conveyer F pivotally mounted at its upper end upon the machine, the chain-and-shovel mechanism $F^5$ mounted therein, with a support connected to the lower end of the conveyer, means for raising and lowering said support and for holding the conveyer in any desired position, so that the rate of feed will be increased as the support is raised and diminished as the support is lowered, and means for driving said chain-and-shovel mechanism.

2. The shaft B; the conveyer F journaled thereon at its upper end, and provided with conveying mechanism adapted to be driven by the said shaft; the uprights $A^7$; a windlass journaled therein; connections between the said windlass and the lower end of the conveyer; and means for revolving the windlass and securing the same, adapted to raise or lower the lower end of the conveyer and hold the same in such position, so that thereby the rate of feed may be increased or diminished as desired.

3. The shaft B, a conveyer F, provided with conveying mechanism actuated by the shaft B; an extension-feed J detachably mounted upon the machine; mechanism adapted to connect the conveying mechanism of the extension-feed with the shaft B, and actuate the former from the latter; and a clutch adapted to throw the said connecting mechanism into and out of operation.

4. The conveyer F; the shaft B adapted to actuate the conveying mechanism of the said conveyer, provided with the bevel-gear $B^2$; the counter-shaft D, provided with the bevel-gear $D'$, engaging with the bevel-gear $B^2$; the sprocket-wheel $D^4$ mounted on the shaft D; a clutch adapted to throw the said sprocket-wheel into and out of operation with the shaft D; the extension-feed J detachably connected with the machine; conveying mechanism therein; and power-transmitting mechanism connecting the said conveying mechanism with the sprocket-wheel $D^4$.

5. The rear sill extensions $A^3$, uprights $A^7$, diagonally-disposed supports $A^8$, and the cross-piece $A^9$ connecting said supports; the box G mounted on the said cross-piece; the sleeve G' rotatably mounted therein; the shaft H mounted in the said sleeve, and provided with the sprocket-wheel $H^2$; mechanism connecting the shaft H with the extension-feed J, adapted to drive the latter from the former; the driving sprocket-wheel $D^4$ mounted upon the machine; the sprocket-chain $H^3$ connecting the sprocket-wheels $D^4$ and $H^2$; and the brace-bar $G^4$, adjacent to the said chain, connecting the sleeve G' with the main frame of the machine.

6. The driving sprocket-wheel $D^4$ mounted upon the main frame; the sleeve G' mounted upon a supplemental frame; the shaft H mounted in the said sleeve, and provided with the sprocket-wheel H²; connections between the said shaft and the extension-feed J adapted to drive the latter from the former; the sprocket-chain H³ connecting the sprocket-wheels H² and D⁴; the brace-bar G⁴, disposed adjacent thereto, engaging the sleeve G' and secured to the main frame of the machine; and chain-tighteners mounted upon the said brace-bar.

7. The conveyer F in the rear thereof adapted to feed to the machine, mounted on the said machine; a supplemental framework carried by the said machine; a box G mounted thereon; a sleeve G' revolubly mounted in the said box, forked at its lower end and provided with bearings $g$ and $g'$; a shaft H mounted in the sleeve G', adapted to be driven from the machine, and provided with a bevel-gear H'; the counter-shaft I mounted in the bearings $g$ and $g'$, provided with the bevel-gear I', engaging with the bevel-gear H', and carrying a sprocket-wheel I²; the extension-feed J; means for connecting the same with the sleeve G'; and means for transmitting power from the sprocket-wheel I² to the conveying mechanism in the said extension-feed.

8. The conveyer F in the rear thereof adapted to feed to the machine, mounted on the said machine; a supplemental framework carried by the said machine; a box G mounted thereon; a sleeve G' revolubly mounted in the said box, forked at its lower end and provided with bearings $g$ and $g'$; a shaft H mounted in the sleeve G', adapted to be driven from the machine, and provided with a bevel-gear H'; the counter-shaft I mounted in the bearings $g$ and $g'$, provided with the bevel-gear I', engaging with the bevel-gear H', and carrying a sprocket-wheel I²; the extension-feed J, provided with arms J³ adapted to hook upon the bearings $g$ and $g'$; and means for transmitting power from the sprocket-wheel I² to the conveying mechanism in the said extension-feed.

9. The supplemental feed M; the casting N mounted thereon, projecting below the bottom thereof, provided with the pin $n$ and the latch $n'$; the casting N' similarly mounted, provided with the aperture $n^4$; the extension-feed J; the casting O mounted thereon and projecting upward therefrom, provided with the aperture $o$, adapted to receive the pin $n$; and the similar casting O', similarly mounted, and provided with the pin $o^2$ adapted to engage in the perforation $n^4$.

JOHN H. GILMAN.

Witnesses:
GEO. C. RICKLY,
C. FRED CLAUS.